United States Patent
Seelinger et al.

(10) Patent No.: US 6,194,860 B1
(45) Date of Patent: Feb. 27, 2001

(54) MOBILE CAMERA-SPACE MANIPULATION

(75) Inventors: Michael J. Seelinger, Urbana, IL (US); John-David S. Yoder, Bluffton, OH (US); Steven B. Skaar, South Bend, IN (US)

(73) Assignee: Yoder Software, Inc., Urbana, IL (US)

( * ) Notice: Subject to any disclaimer, the term of this patent is extended or adjusted under 35 U.S.C. 154(b) by 0 days.

(21) Appl. No.: 09/430,940

(22) Filed: Nov. 1, 1999

(51) Int. Cl.⁷ .................................................. B62D 1/00
(52) U.S. Cl. .......................... 318/587; 318/586; 901/1; 901/47; 395/89; 395/94
(58) Field of Search .................... 318/560–696; 364/424.02, 424.06; 395/89, 94; 901/1, 7, 47, 50, 46; 33/288, 203.18; 356/155, 375; 701/25, 50, 28; 187/224, 231; 180/169; 414/274, 730; 358/103

(56) References Cited

U.S. PATENT DOCUMENTS

| | | | |
|---|---|---|---|
| 4,146,924 | * 3/1979 | Birk et al. | 364/513 |
| 4,575,304 | * 3/1986 | Nakagawa et al. | 414/730 |
| 4,613,942 | * 9/1986 | Chen | 364/513 |
| 4,636,137 | * 1/1987 | Lemelson | 414/730 |
| 4,639,878 | * 1/1987 | Day et al. | 364/513 |
| 4,679,152 | * 7/1987 | Perdue | 364/513 |
| 4,754,415 | * 6/1988 | George et al. | 364/513 |
| 4,789,940 | * 12/1988 | Christian | 364/468 |
| 4,796,200 | * 1/1989 | Pryor | 364/513 |
| 4,815,008 | * 3/1989 | Kadonoff et al. | 364/513 |
| 4,833,383 | 5/1989 | Skaar et al. . | |
| 5,046,022 | * 9/1991 | Conway et al. | 364/513 |
| 5,300,869 | 4/1994 | Skaar et al. . | |
| 5,523,663 | 6/1996 | Tsuge et al. . | |
| 5,938,710 | * 8/1999 | Lanza et al. | 701/50 |
| 5,943,783 | * 8/1999 | Jackson | 33/288 |

* cited by examiner

*Primary Examiner*—Paul Ip
(74) *Attorney, Agent, or Firm*—Berns Law Office; Michael Berns

(57) ABSTRACT

The invention is a method of using computer vision to control systems consisting of a combination of holonomic and nonholonomic degrees of freedom such as a wheeled rover equipped with a robotic arm, a forklift, and earth-moving equipment such as a backhoe or a front-loader. Using vision sensors mounted on the mobile system and the manipulator, the system establishes a relationship between the internal joint configuration of the holonomic degrees of freedom of the manipulator and the appearance of features on the manipulator in the reference frames of the vision sensors. Then, the system, perhaps with the assistance of an operator, identifies the locations of the target object in the reference frames of the vision sensors. Using this target information, along with the relationship described above, the system determines a suitable trajectory for the nonholonomic degrees of freedom of the base to follow towards the target object. The system also determines a suitable pose or series of poses for the holonomic degrees of freedom of the manipulator. With additional visual samples, the system automatically updates the trajectory and final pose of the manipulator so as to allow for greater precision in the overall final position of the system.

18 Claims, 4 Drawing Sheets

MOBILE CAMERA-SPACE MANIPULATION

STATEMENT OF GOVERNMENT RIGHTS

The work disclosed in this application was supported in part by a grant from the NASA-SBIR program to Yoder Software, Inc., therefore, the U.S. Government may have some rights in the present invention.

BACKGROUND OF THE INVENTION

1. Field of the Invention

The invention relates to a practical means of using computer vision to control systems consisting of a combination of holonomic and nonholonomic degrees of freedom in order to perform user-designated operations on stationary objects. Examples of combination holonomic/nonholonomic systems are a wheeled rover equipped with a robotic arm, a forklift, and earth-moving equipment such as a backhoe or a front-loader and even an underwater vehicle with attached robotic arm.

The present invention eliminates the need for direct, ongoing human participation in the control loop for completing a given task such as engaging a pallet with a forklift. Whereas, depending upon the application of the present invention, the human may supply some high-level supervision for the system such as "engage pallet," the effect of the new art is to create fully autonomous response of the system, synchronized between control of the holonomic and nonholonomic degrees of freedom, which produces effective, precise, reliable and robust direction and control of the mechanism without any subsequent human intervention.

2. References

The remainder of this specification refers to various individual publications listed below by number by reciting, for example, "[1]", or "[2]", and so forth.

[1] E. Gonzalez-Galvan and S. B. Skaar, "Application of a precision enhancing measure in 3-D rigid-body positioning using camera-space manipulation," *International Journal of Robotics Research*, Vol. 16, No. 2, pp. 240–257, 1997.

[2] B. Horn, *Robot Vision*, MIT Press, Cambridge, 1986.

[3] M. Seelinger, S. B. Skaar, and M. Robinson, "An Alternative Approach for Image-Plane Control of Robots," *Lecture Notes in Control and Information Sciences*, Eds. D. Kriegman, G. Hager, and S. Morse, pp. 41–65, Springer, London, 1998.

[4] E. Gonzalez-Galvan and S. B. Skaar, "Servoable cameras for three dimensional positioning with camera-space manipulation," *Proc. LASTED Robotics and Manufacturing*, pp. 260–265, 1995.

[5] S. B. Skaar, I. Yalda-Mooshabad, and W. H. Brockman, "Nonholonomic camera-space manipulation," *IEEE Trans. on Robotics and Automation*, Vol. 13, No. 3, pp. 464–479, August 1992.

[6] R. K. Miller, D. G. Stewart, H. Brockman, and S. B. Skaar, "A camera space control system for an automated forklift," *IEEE Trans. on Robotics and Automation*, Vol. 10, No. 5, pp. 710–716, October 1994.

[7] Y. Hwang. "Motion Planning of a Robotic Arm on a Wheeled Vehicle on a Rugged Terrain," L. A. Demsetz, ed., *Robotics for Challenging Environments, Proc. of RCE II*, pp. 57–63, 1996.

[8] T. Lueth, U. Nassal, U. Rembold. "Reliability and Integrated Capabilities of Locomotion and Manipulation for Autonomous Robot Assembly," *Robotics and Autonomous Systems*. Vol. 14, No.2–3, pp. 185–198, May 1995.

[9] MacKenzie, D. and Arkin, R. "Behavior-Based Mobile Manipulations for Drum Sampling," *Proceedings of the 1996 IEEE Int. Conf. On Robotics and Automation*, pp 2389–2395, April 1996.

[10] C. Perrier, P. Dauchez, F. Pierrot. "A Global Approach for Motion Generation of Non-Holonomic Mobile Manipulators," *Proc. IEEE Int. Conference on Robotics and Automation* pp. 2971–2976, 1998.

[11] O. Khatib, "Mobile manipulation: The robotic assistant," *Robotics and Autonomous Systems*, Vol. 26, pp. 175–183, 1999.

3. Nomenclature

The following is a summary of notation used in this specification:

$C^j=[C_1^j, C_2^j, \ldots, C_6^j]^T$ view parameters for camera $j$ $\Theta=[\theta_1, \theta_2, \ldots, \theta_n]^T$ internal joint configuration of an n-degree of freedom system $(x_{c_i}^j, y_{c_i}^j)$ camera space location of point $i$ in camera $j$ $(f_x, f_y)$ orthographic camera model $J_1, J_2, J_3$ scalar quantities minimized to estimate various parameters $n_{cam}$ number of cameras in system $n_c(j)$ number of visual features used in any given summation p number of poses in the pre-plan trajectory $W_{ik}$ relative weight given to each visual sample

DESCRIPTION OF THE PRIOR ART

1. Camera-Space Manipulation

Camera-space manipulation, hereafter referred to as CSM, was developed as a means of achieving highly precise control of the positioning and orienting of robotic manipulators in the presence of uncertainties in the workspace of the robot. These uncertainties include such things as kinematic errors, kinematic changes due to temperature changes or dynamic loads, or workpieces in unknown or varying positions. U.S. Pat. No. 4,833,383 to Skaar et al., describes CSM. CSM uses computer vision in order to enable a manipulator's load or tool to be positioned and oriented highly accurately relative to an arbitrarily positioned and oriented workpiece. This high accuracy is extremely robust to uncertainties in the robot's workspace. CSM neither relies on the calibration of the camera(s) nor the robot. CSM works in an open-loop fashion, thus real-time image processing is not required.

CSM can operate in a fully autonomous fashion or with supervisory control. A graphical user interface was developed for use with CSM. Through this interface, the user can view either a live or still-frame image of the workspace of the robot. By clicking on this image, the user selects the surface, or region or juncture on the surface, upon which the operation will be performed. The user also selects the type of task to be performed by the robot from the interface program Additionally, the user sets other operating parameters such as the speed of the manipulator.

2. Description of CSM

CSM works by establishing a relationship between the appearance of image-plane visual features located on the manipulator with the internal joint configuration of the robot. If the positioning task involves more than two dimensions, then at least two cameras must be used. The relationship, described with a set of view parameters given by $C=[C_1, C_2, \ldots, C_6]^T$, is determined for each of the participating cameras. This relationship is based on the orthographic camera model:

$$x_c^j=((C_1^j)^2+(C_2^j)^2-(C_3^j)^2-(C_4^j)^2)X+2(C_2^jC_3^j+C_1^jC_4^j)Y+2(C_2^jC_4^j-C_1^jC_3^j)Z+C_5^j$$

$$y_c^j=2(C_2^jC_3^j-C_1^jC_4^j)X+((C_1^j)^2-(C_2^j)^2+(C_3^j)^2-(C_4^j)^2)Y+2(C_3^jC_4^j+C_1^jC_2^j)Z+C_6^j \quad (1)$$

where $(x_c^j, y_c^j)$ represents the estimated image-plane location of a feature on the robot's end effector in the $j^{th}$ participating camera. The position vector $(X,Y,Z)$, describes the location of the manipulator feature relative to a reference frame tied to the robot. It is a function of the internal joint configuration, $\Theta=[\theta_1,\theta_2, \ldots ,\theta_n]^T$ for an n degree-of-freedom robot, and the model of the robot's forward kinematics. For convenience, Eq. (1) is rewritten as:

$$x_c^j = f_x(\Theta, C^j)$$

$$y_c^j = f_y(\Theta, C^j)$$

The view parameters are initialized through a process called the pre-plan trajectory. During the pre-plan trajectory, the robot is driven to a set number of poses (between 10 and 20), spanning both a large region of the robot's joint space as well as wide regions of the camera spaces. At each of these poses, images are acquired in all participating cameras and the locations of the designated manipulator features are found in each of these images. Then the view parameters for the $j^{th}$ camera are estimated by minimizing over all $C=[C_1, C_2, \ldots, C_6]^T$:

$$J_1 = \sum_{k=1}^{p}\left[\sum_{i=1}^{n_c(k)}\{[x_{c_i}^j - f_x(\Theta, C^j)]^2 + [y_{c_i}^j - f_y(\Theta, C^j)]^2\}W_{ik}\right]$$

where p is the number of poses in the pre-plan trajectory, $n_c(k)$ is the number of features found in the image corresponding to camera j for pose number k, $W_{ik}$ is the relative weight given to feature number i in pose number k, and $(x_{c_i}^j, y_{c_i}^j)$ represents the actual image-plane location of the $i^{th}$ cue located on the robot's end effector in the $j^{th}$ participating camera. The weighting factor might be chosen based on the location of a given feature with respect to the end of the manipulator. For instance, features located closer to a tool held in the manipulator might receive more relative weight than those located farther away from it.

Once the view parameters have been established in each of the participating CSM cameras, it is possible to use the relationship described by Eq. (1) to position the robot. In order to accomplish this, it is necessary to create or determine compatible camera-space targets. "Compatible" targets refer to how well a given target point in the reference frames of the different cameras represents the same physical three-dimensional surface point. If a sufficient number of camera-space targets are determined, then the internal joint configuration of the robot, can be found by minimizing $J_2$ over all $\Theta$:

$$J_2 = \sum_{j=1}^{n_{cam}}\left[\sum_{i=1}^{n_c(j)}\{[x_{c_i}^j - f_x(X_i, Y_i, Z_i, C^j)]^2 + [y_{c_i}^j - f_y(X_i, Y_i, Z_i, C^j)]^2\}\right] \quad (3)$$

where $n_{cam}$ is the number of participating cameras and $n_c(j)$ is the number of camera-space target pairs, $(x_{c_i}^j, y_{c_i}^j)$. The three-dimensional point, is measured relative to the coordinate system attached to the robot and is a function of the internal joint configuration of the robot, $\Theta$, and refers to the location of the $i^{th}$ target point in the robot reference frame that is to be aligned with the camera-space target points, $(x_{c_i}^j, y_{c_i}^j)$, where $j=1, \ldots, n_{cam}$. In order to achieve three-dimensional positioning of the manipulator, it is necessary to have one set of camera-space targets in at least 2 cameras. To achieve both three-dimensional position and orientation of the manipulator more sets of camera-space targets are necessary. Consider, for instance, the task of engaging a pallet with a forklift tool mounted on a robot. In this case, both position and orientation are critical to complete the task successfully. In light of the pallet-engaging task, one way to look at Eq. (3) is to ask the following question: Where do the cues on the manipulator have to appear in the camera-spaces in order for the forklift to engage the pallet? The camera-space locations of the cues, the answer to the preceding question, become the sets of camera-space targets, $(x_{c_i}^j, y_{c_i}^j)$, which are used in Eq. (3) to resolve the robot joint rotations.

As mentioned above, Eq. (1) is based on the rather simple orthographic camera model. It is well known that the orthographic camera model is far from a perfect description of the mapping from a three-dimensional reference frame into a two-dimensional image. CSM takes advantage of estimation to compensate for an admittedly flawed camera model as well as other model imperfections, such as the robot's forward kinematics, and is thus able to achieve a high level of precision in positioning the robot. The view parameters can be updated with as many new sample pairs of visual images and robot joint poses as become available. As the manipulator moves towards its terminal position, camera samples are taken. In these images, the manipulator is located in a much smaller or local region of camera space and manipulator joint space. The view parameters are updated with this local information, which is given more relative weight than the samples obtained during the pre-plan trajectory. With the emphasis on the local information, the view parameters accurately map from three-dimensions into two-dimensions in the local region.

A process called flattening is another measure that has been taken in order to improve the overall precision of the system [1]. Using the parameters of the orthographic camera model and minimal additional information, it is possible to obtain identical results as would have been achieved by using the more accurate pinhole camera model. The process of flattening becomes more important as the perspective effect [2] becomes more dominant. For instance, when a camera is located at a large distance from a small workpiece, the perspective effect is minimal. However, as the workpiece is moved closer to the camera, the perspective effect becomes more noticeable thus making the flattening process more important.

3. Estimation in CSM

The use of estimation as a basis for doing CSM has many advantages over other vision guided robotic strategies. For instance, neither the cameras nor the robot need be calibrated in order for CSM to work. Problems with calibration involve the initial determination of internal camera parameters, internal robot parameters, and the parameters describing the relationship between the camera(s) and the robot. Additionally, it is extremely difficult, if not impossible, to maintain this calibrated relationship, especially when the environment itself is hostile to the system. CSM makes use of the best kinematic model available for the robot in conjunction with the video samples acquired in a normal positioning maneuver to describe the relationship between the internal joint configuration of the robot and the image-plane appearance of manipulator features. The estimation of this relationship (the view parameters) involves giving samples in the local joint-space and camera-space regions more relative weight. This skewed weighting allows the system to achieve a high level of accuracy in positioning in this region. The fact of the matter is that due to inaccuracies in the orthographic camera model, errors in the robot's kinematics, and other system errors, the view parameters do not do a perfect job of describing the relationship between the internal joint configuration of the robot and the image-plane appearance of manipulator features for a wide range of joint and camera space. Using estimation and skewing the weighting of samples to the local operating regions of camera and joint space overcome these errors by ensuring that these errors are insignificant in the region of interest. Application of the flattening process described above makes this process even more precise.

Another advantage that CSM has over other vision-guided control strategies is that it does not rely upon constant visual access to the target workpiece. If the target becomes obscured during the positioning trajectory, which is often caused by the robot itself, CSM still is able to complete the task [3]. During the positioning trajectory of the robot there are many factors that can cause the surface of interest to become obscured from the view of one of the cameras. When some type of visual obstruction occurs, the CSM-driven system continues the positioning trajectory using the best information available. In the event that more information becomes available through additional camera samples, this information is used to update the view parameters, and in turn, the target terminal pose. Related to this advantage is the fact that CSM does not rely upon real-time image processing. New information acquired by the system as it moves towards the target terminal pose is incorporated, as it becomes available. The time delay between when the image was acquired and when the information is used does not negatively affect system performance.

4. CSM's Limitation to Fixed-Cameras

As mentioned previously, CSM does not rely on camera calibration. The position of each camera need not be known by the system. Any of a wide variety of camera positions provides the same highly accurate results in positioning the robot. For a given camera/robot setup, the pre-plan trajectory provides sufficient information for establishing the relationship described by the view parameters. If a given camera is moved after the pre-plan trajectory, it is necessary to rerun the pre-plan trajectory. It may be possible to avoid this step if the system knows approximately how much the camera has moved. This is the case with cameras mounted on pan/tilt units where it is possible to monitor the changes in the pan and tilt angles [4].

While CSM does provide considerable flexibility in camera position, it has been limited to using fixed cameras. Once the view parameters are initialized for a given configuration, traditional CSM mandates that the cameras remain in place. While this is fine for holonomic manipulators with fixed workspaces, this is a severe limitation for mobile, nonholonomic systems. CSM was previously used with cameras fixed on the wall to control a nonholonomic system [5,6]. However, since the cameras were fixed on the wall, the system could only function in a limited workspace. Accuracy was dependent on distance from the cameras. Additionally, such a system would be impractical for 'exploring' robots, such as the NASA Sojourner, which is working in an environment where widely separated fixed cameras are not available.

As discussed in the previous section, CSM has proven to be a highly accurate, robust, and calibration-free means of controlling manipulators. It has even been used to control a nonholonomic robot [5,6]. However, it has always been limited by its need for fixed cameras.

U.S. Pat. No. 5,300,869 to Skaar et al., discloses a system for controlling a nonholonomic robot with fixed cameras. While this need does not present a problem for holonomic systems, it becomes a major limitation when dealing with nonholonomic systems. At best, the need for fixed cameras limits the workspace, while at worst, it makes use of the system impossible, since in many of the environments where such systems might be used, for example hazardous environments and space exploration, it is difficult or impossible to preposition fixed cameras.

Also, it has been noticed that most of the algorithms for controlling holonomic/nonholonomic systems had not been making the best possible use of the systems [7–11]. That is, in most cases, the problem was broken down to first position the vehicle close to the target, and then control the high degree of freedom arm to complete the task. While this does provide a means for controlling such systems, it wastes several degrees of freedom. This becomes especially important for space payloads, where extra degrees of freedom means extra cost and weight, and reduces reliability. It is also important for potential commercial retrofits. For example, existing algorithms could never be used to retrofit a standard forklift, since the design of the forklift requires that the vehicle be in a particular location to engage the pallet correctly. That is, one cannot simply move the forklift close to the pallet, and expect the lift mechanism to be able to engage the pallet. Rather, the vehicle must be maneuvered with the limited degrees of freedom of the lift mechanism in mind in order to be able to engage the pallet successfully.

U.S. Pat. No. 5,523,663 to Tsuge, et al., attempts to address the fixed-camera problem of controlling a nonholonomic/holonomic system. It is limited to using a single camera mounted vertically on the end of a manipulator. This system would not be useful in most applications.

SUMMARY OF THE INVENTION

The present invention, known as mobile camera-space manipulation, hereinafter referred to as MCSM, overcomes the fixed-camera limitation of traditional CSM in order to make control of holonomic/nonholonomic systems possible, and efficient. It is an object of the present invention to provide an accurate, robust, calibration-free means of controlling the entire holonomic/nonholonomic system with this objective in mind. This has the benefit of increasing the workspace of the mobile system, which would then be limited only by the area through which the MCSM system could traverse.

Additionally, MCSM retains the benefits of standard CSM. For instance, precise calibration of the cameras, and the system kinematics is unnecessary. Such a calibration would be difficult to maintain if a mobile system were operating in a challenging environment such as in planetary surface exploration. Likewise, MCSM is able to achieve a high level of precision in positioning the system relative to an arbitrarily located target object. Finally, MCSM makes efficient use of all of the degrees of freedom of the system such that a minimal number of holonomic degrees of freedom are required to accomplish any given task.

There are many existing cases of human-controlled systems which are comprised of a combination of nonholonomic mobility and an on-board, holonomic manipulator, including forklifts and backhoes. The ongoing need to maintain human concentration throughout execution of a trajectory in order to engage, move or position an object or objects, and the susceptibility to human error that this requirement causes, is reason to seek a practical solution that is fully autonomous or semi-autonomous with human supervisory control only. Moreover, because of the difficulty of a human operator to produce highly accurate control of such a system a variety of tasks that might otherwise be economically performed using a nonholonomic system are not now performed. The present invention, by contrast, achieves a level of precision well in excess of what a human operator could be expected to do with such hardware. Therefore, new applications may well arise once the autonomous capability is established.

Additionally, MCSM could be used to remotely operate such combination holonomic/nonholonomic systems. This would be particularly useful in hazardous or challenging environments such as mine removal, hazardous waste clean up, or planetary surface exploration.

The invention is a method of using computer vision to control systems consisting of a combination of holonomic and nonholonomic degrees of freedom. Briefly, holonomic systems are systems, such as typical robotic arms, for which the relationship between end effector position and joint rotations can be expressed algebraically. On the other hand, in nonholonomic systems, such as typical mobile robots, this end effector/joint rotation relationship is not simply algebraic, rather it is differential. One of the ramifications of the differences between holonomic and nonholonomic systems, is that the overall position of the end effector of a nonholonomic system is dependent upon the path that the joints take in moving towards their final position. In the case of the holonomic system, given that the joints are in a certain pose, the end effector will always be in the same physical position regardless of what path the joints took in moving to this particular pose.

Clearly many mobile systems need a holonomic manipulator to do useful work. Examples of this are the fork manipulator on a typical forklift and the arm of a backhoe. In most instances, these combination holonomic/nonholonomic system require that the operator control all of the joints of the system directly. This is the case with the forklift, where the operator drives the vehicle and controls the height and tilt of the fork directly. The ongoing need to maintain human concentration throughout execution of a trajectory in order to engage, move or position an object or objects, and the susceptibility to human error that this requirement causes, is reason to seek a practical solution that is fully autonomous or semi-autonomous with human supervisory control only. Moreover, because of the difficulty of a human operator to produce highly accurate control of such a system a variety of tasks that might otherwise be economically performed using a nonholonomic system are not now performed. The present invention, by contrast, achieves a level of precision well in excess of what a human operator could be expected to do with such hardware.

There has been some research in the field of automatically controlling combination holonomic/nonholonomic systems. Much of the work done in the control of such systems treats the control of the two systems completely separately—that is, the mobile or nonholonomic base is moved into a position close to the target, and then a high degree of freedom, holonomic manipulator is used to complete the task. These systems have to deal with resolving redundant degrees of freedom, and thus, in some sense, these approaches waste the degrees of freedom of the nonholonomic base. The present invention provides a means of controlling both the nonholonomic base and the holonomic manipulator together such that only a minimal number of holonomic degrees of freedom are necessary to achieve any given task.

DETAILED DESCRIPTION OF THE PREFERRED EMBODIMENT

1. Standard CSM Part of MCSM

Figure 1:
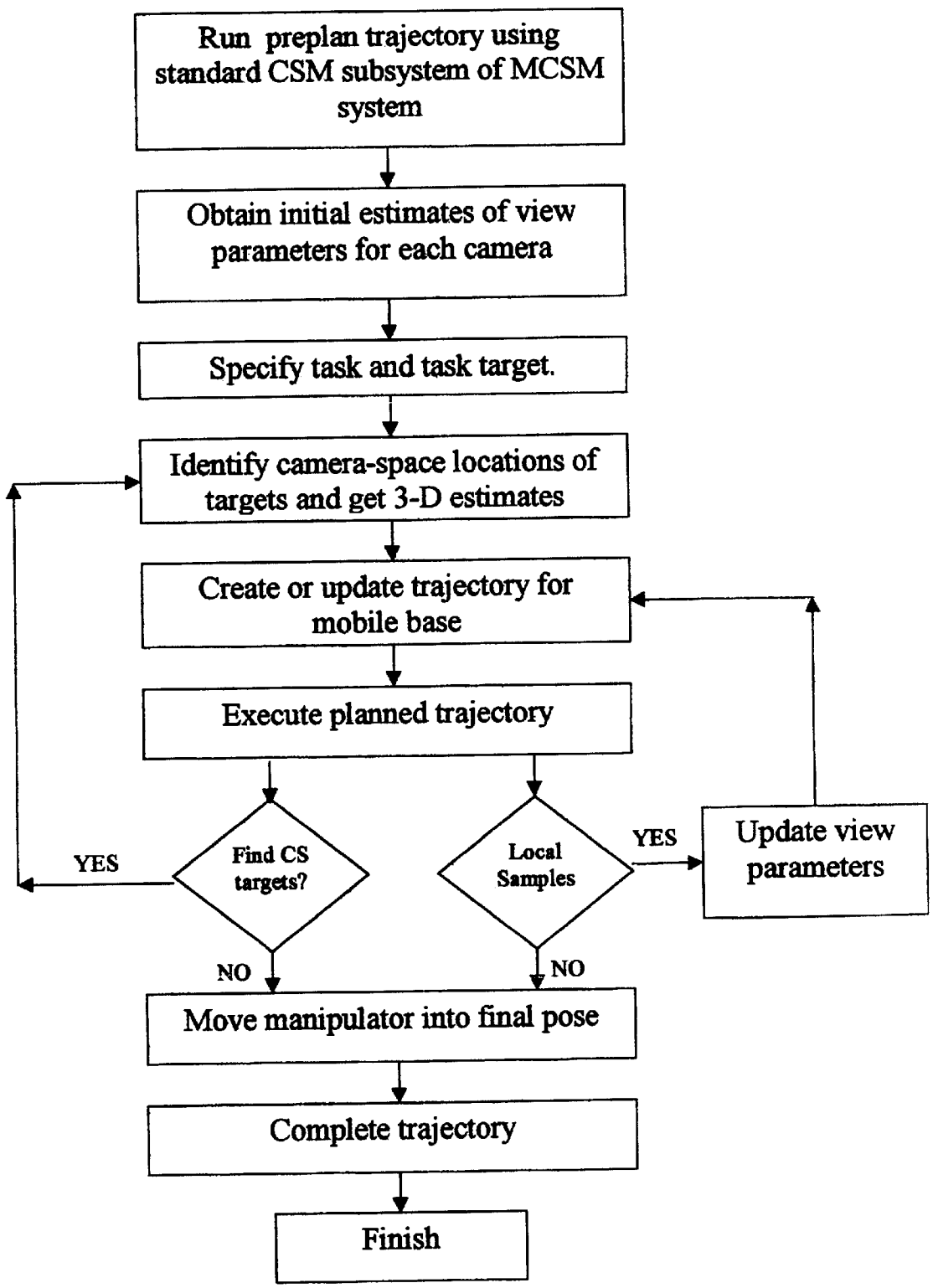
FIG. 1 is a block diagram of a process of the invention.
Figure 2:
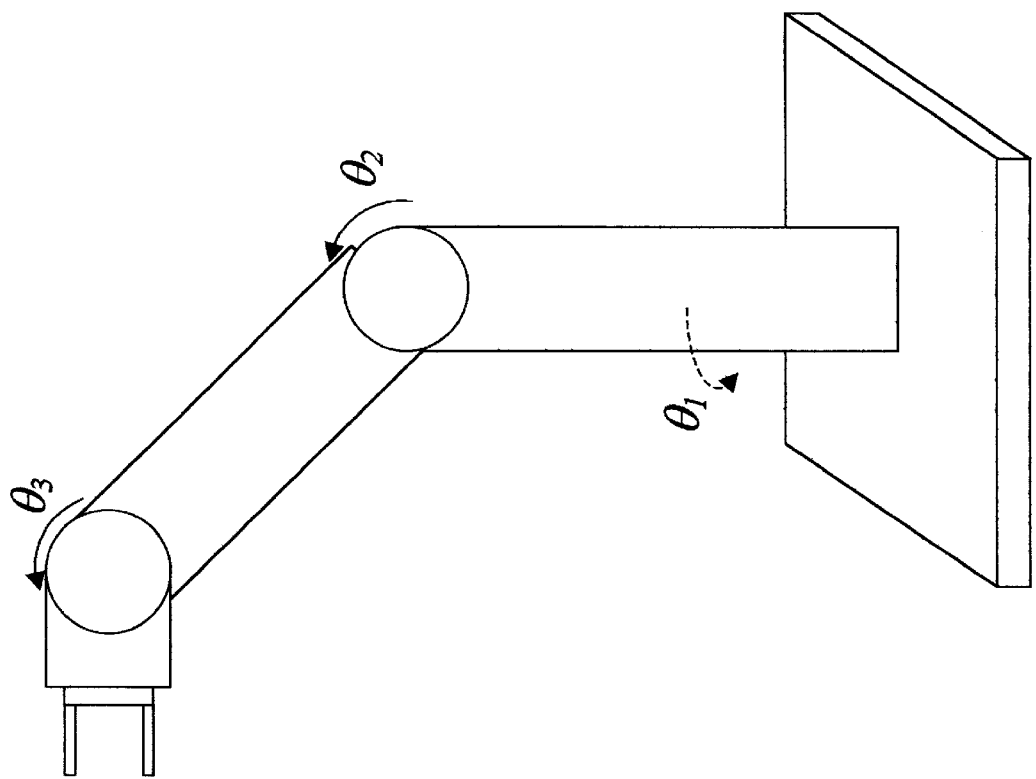
FIG. 2 is a diagram of a prior art camera-space manipulation, using fixed cameras, a holonomic robot of at least one degree of freedom, and a computer equipped with suitable hardware to control the cameras as well as the robot.
Figure 2:
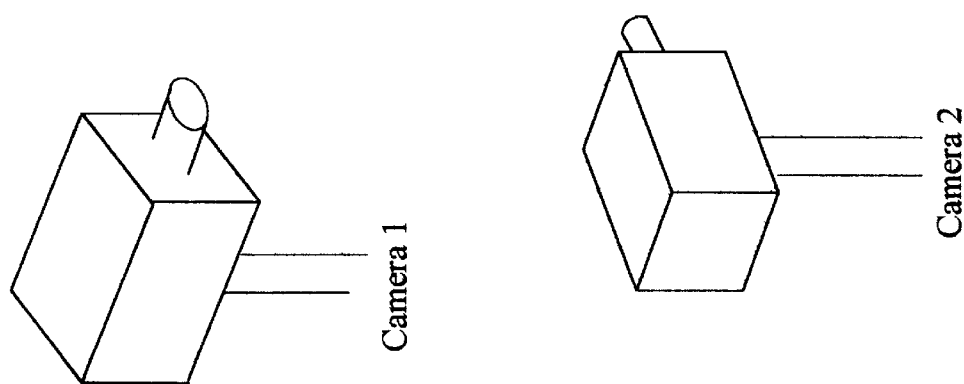

The present invention uses a form of CSM as a necessary subsystem, as part of the combination holonomic/nonholonomic system. FIG. 2 shows such a CSM system, which consists of at least two cameras and some sort of manipulator with at least one holonomic degree of freedom. In the present invention, the standard CSM system must be part of some mobile base consisting of nonholonomic degrees of freedom In one embodiment, the rover shown in FIG. 3 contains a standard CSM system consisting of two cameras and a single degree of freedom arm. This standard CSM system is mounted onto, or integrated into, the mobile base. The mobile base itself has two nonholonomic degrees of freedom in its independently driven front wheels. MCSM is not limited to this particular combination of holonomic and nonholonomic degrees of freedom. For instance, the forklift shown in FIG. 4 could be an MCSM system. This particular forklift system has three holonomic degrees of freedom: the vertical lift of the fork ($h_1$), the tilt angle of the fork ($h_2$), and the sideshift of the fork ($h_3$). There are also the two nonholonomic degrees of freedom drive angle ($h_4$) and power to the drive wheels ($h_5$). The standard CSM subsystem of this MCSM system would consist of two cameras mounted on the forklift along with the three holonomic degrees of freedom of the fork manipulator.

The first step in the MCSM process is to establish the view parameters in each camera using the standard CSM subsystem. This step involves running a pre-plan trajectory in which all of the holonomic degrees of freedom of the manipulator are moved to a series of predetermined poses. At each of these poses, video samples are acquired in each of the cameras. The camera-space locations of features on the manipulator are determined using standard image processing techniques. The view parameters for each camera are found by minimizing Eq. (3).

2. Determination of Target Objective

Once the view parameters have been established it is necessary to determine some target objective. The target objective will be dependent on the type of task being performed. For instance, in the case of a forklift, the target objective might be engaging a certain pallet, which is in the field of view of one of the cameras. For the rover with attached robotic arm, the target objective might be picking up a rock or placing some scientific instrument carried by the robotic arm at a certain location relative to a given rock or object.

In order to carry out the designated task it is necessary to define camera-space locations of the target point(s), ($x_{c_i}^j$, $y_{c_i}^j$). An operator assists in choosing a specific camera-space target location. The operator does this by viewing one or more images from the cameras on the MCSM system. In these images, the operator selects a point that corresponds to the target. In the case of the rover engaging a rock, the operator, with the assistance of image processing software, may simply select the center of the rock. In the case of the forklift engaging a pallet, the user might select one or more of the corners as the camera-space target locations. The operator either must select the corresponding points in the other camera-spaces or use image processing software to automatically determine the corresponding points.

Once the camera-space location of a target point is determined in at least two cameras, it is possible to get an estimate of the three dimensional location of the $i^{th}$ target point relative to the MCSM system, $(X_i, Y_i, Z_i)$. It is important to note that the three dimensional location is measured in the coordinate system that is attached to the holonomic manipulator. In order to determine the three dimensional location of this target point, the following equation is minimized over all $(X_i, Y_i, Z_i)$:

$$J_3 = \sum_{j=1}^{n_{cam}} [[x_{c_i}^j - f_x(X_i, Y_i, Z_i, C^j)]^2 + [y_{c_i}^j - f_y(X_i, Y_i, Z_i, C^j)]^2] \quad (4)$$

This can be accomplished by carrying out at least squares minimization of Eq. (4). The necessary conditions for the least squares minimization give three equations:

$$\frac{\partial J_3}{\partial X_i} = 0, \frac{\partial J_3}{\partial Y_i} = 0, \frac{\partial J_3}{\partial Z_i} = 0. \quad (5)$$

After carrying out the partial derivatives listed in Eq. (5), the equations can be put into matrix form:

$$\{r_1\} = \begin{bmatrix} M_{11} & M_{12} & M_{13} \\ M_{21} & M_{22} & M_{23} \\ M_{31} & M_{32} & M_{33} \end{bmatrix} \begin{Bmatrix} X_i \\ Y_i \\ Z_i \end{Bmatrix}, \quad (6)$$

where $$\{r_1\} = \begin{Bmatrix} \sum_{j=1}^{n_{cam}} (x_{c_i}^j b_1^j + y_{c_i}^j b_5^j - b_1^j b_4^j - b_5^j b_8^j) \\ \sum_{j=1}^{n_{cam}} (x_{c_i}^j b_2^j + y_{c_i}^j b_6^j - b_2^j b_4^j - b_6^j b_8^j) \\ \sum_{j=1}^{n_{cam}} (x_{c_i}^j b_3^j + y_{c_i}^j b_7^j - b_3^j b_4^j - b_7^j b_8^j) \end{Bmatrix} \quad (7)$$

and $$\begin{bmatrix} M_{11} & M_{12} & M_{13} \\ M_{21} & M_{22} & M_{23} \\ M_{31} & M_{32} & M_{33} \end{bmatrix} = \begin{bmatrix} \sum_{j=1}^{n_{cam}} ((b_1^j)^2 + (b_5^j)^2) & \sum_{j=1}^{n_{cam}} (b_1^j b_2^j + b_5^j b_6^j) & \sum_{j=1}^{n_{cam}} (b_1^j b_3^j + b_5^j b_7^j) \\ \sum_{j=1}^{n_{cam}} (b_1^j b_2^j + b_5^j b_6^j) & \sum_{j=1}^{n_{cam}} ((b_2^j)^2 + (b_6^j)^2) & \sum_{j=1}^{n_{cam}} (b_2^j b_3^j + b_6^j b_7^j) \\ \sum_{j=1}^{n_{cam}} (b_1^j b_3^j + b_5^j b_7^j) & \sum_{j=1}^{n_{cam}} (b_2^j b_3^j + b_6^j b_7^j) & \sum_{j=1}^{n_{cam}} ((b_3^j)^2 + (b_7^j)^2) \end{bmatrix} \quad (8)$$

In order to solve for $(X_i, Y_i, Z_i)$, Eq. (6) is rearranged as:

$$\begin{Bmatrix} X_i \\ Y_i \\ Z_i \end{Bmatrix} = \begin{bmatrix} M_{11} & M_{12} & M_{13} \\ M_{21} & M_{22} & M_{23} \\ M_{31} & M_{32} & M_{33} \end{bmatrix}^{-1} \{r_1\} \quad (9)$$

It is important to note that the process of determining $(X_i, Y_i, Z_i)$ for a given set of camera-space target points is dependent on the view parameters, $C^j = [C_1^j, C_2^j, \ldots, C_6^j]^T$, for each camera. Thus, if the view parameters change based on updated information, then the three dimensional estimate of the target location, $(X_i, Y_i, Z_i)$ would also change even though the actual position of the target might not have changed.

3. Trajectory Generation

Figure 3:
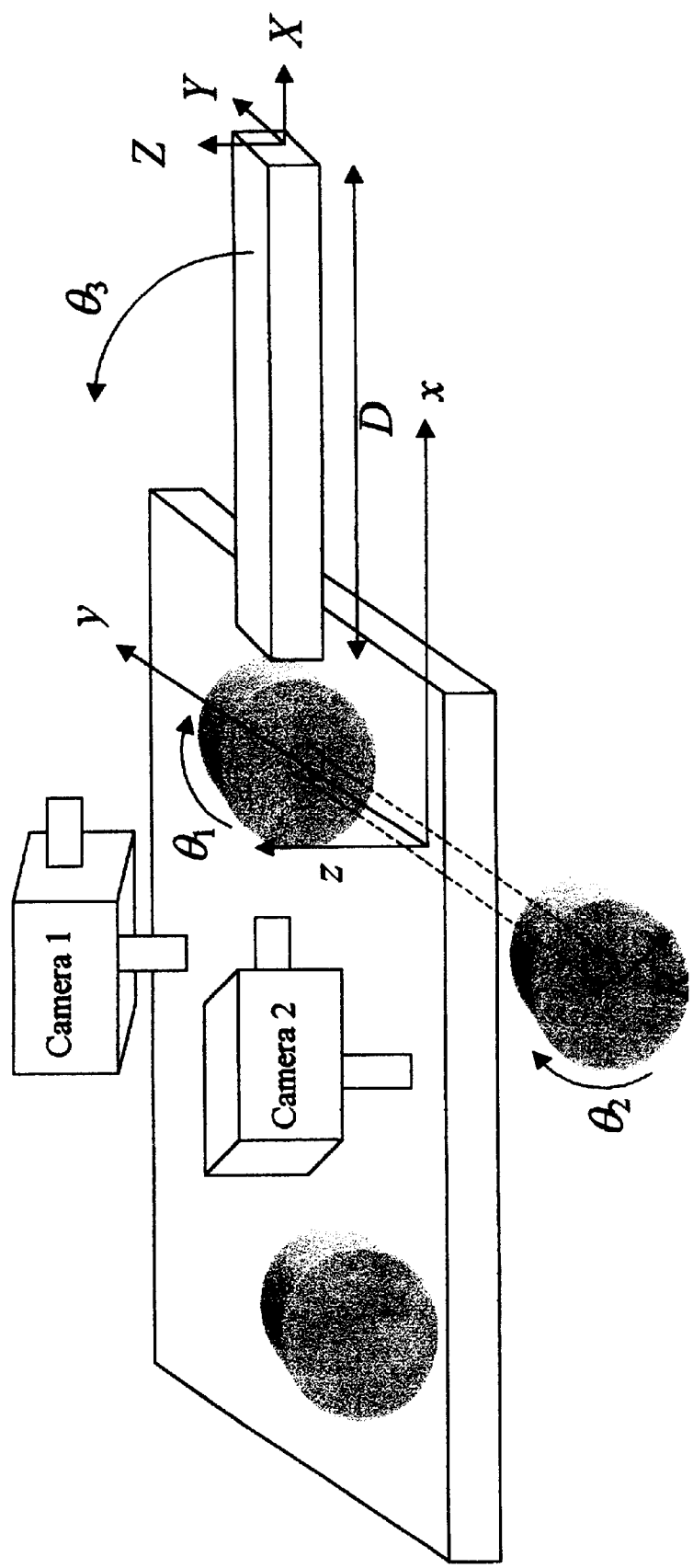
FIG. 3 is a diagram of a rover with mobile base controlled by $\theta_1, \theta_2$ with a single holonomic degree of freedom manipulator characterized by $\theta_3$ measured relative to the X,Y,Z coordinate system attached to the holonomic manipulator.
Figure 4:
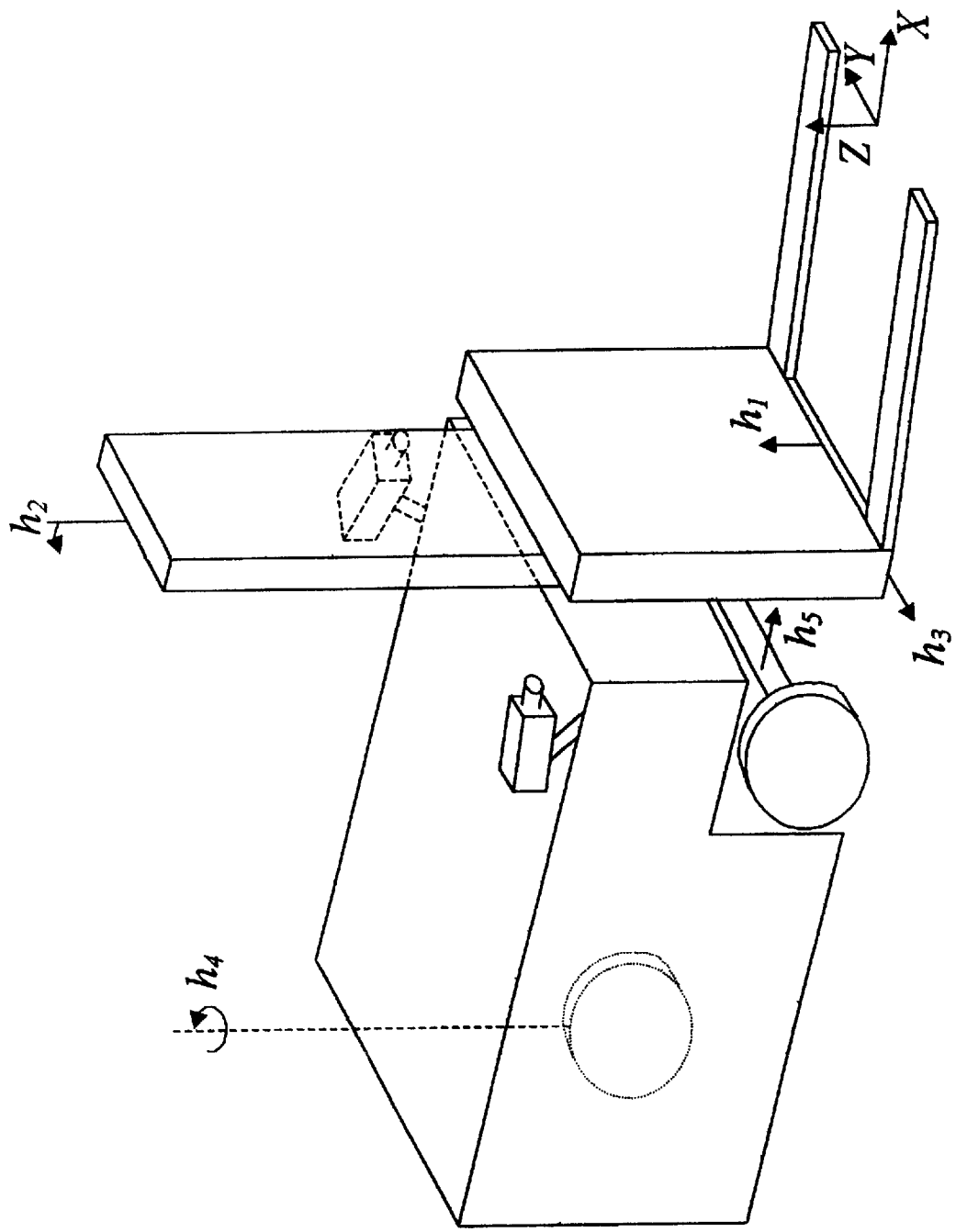
FIG. 4 is a diagram of a forklift system having holonomic degrees of freedom on the fork manipulator of vertical lift ($h_1$), tilt angle ($h_2$), sideshift ($h_3$), and nonholonomic degrees of freedom of the mobile base of steering angle ($h_4$) and thrust forward or reverse ($h_5$).

Once there is an estimate of the three dimensional position of the target, it is possible to generate a trajectory for the vehicle to follow such that upon completion of the trajectory, the MCSM system can complete its task. If the task were engaging a pallet with a forklift system, the trajectory would allow for a suitable entry of the forks into the openings of the pallet. In this case, the trajectory must control the angle of approach of the vehicle. In the case of a rover system placing a scientific instrument at some specified distance from a target rock, the angle of approach of the rock may not be important. In this case, the trajectory planned would terminate with the rover in a position such that it is possible to locate the scientific instrument in the proper place using only the holonomic degrees of freedom of the onboard robotic arm. If the rover system has only a single degree of freedom arm, as shown in FIG. 3, then successful completion of the task is dependent upon the nonholonomic degrees of freedom of the rover base moving the rover into the proper position for the arm to complete the task. If the rover had a higher degree of freedom robotic arm, it might be possible to position the rover base somewhat close to the target rock. Then, the multiple degrees of freedom of the robotic arm could do the fine positioning, compensating for inaccuracies in the position of the mobile base. This solution would require the resolution of redundant degrees of freedom. While MCSM could handle such redundancy, it is not necessary since MCSM achieves precise control of the nonholonomic degrees of freedom of the system requiring only the minimum number of holonomic degrees of freedom to complete any given task.

Once a trajectory has been planned, the system will begin motion following the desired path as close as possible. The means of controlling the vehicle such that it traverses the desired path is dependent on the configuration of the vehicle itself. For instance, the rover shown in FIG. 3 has independently driven front wheels. Each drive wheel has a computer controlled servomotor equipped with a gearhead that produces sufficient torque to move the rover over rough terrain. Steering the rover is accomplished by controlling the speed with which the second wheel moves relative to the first wheel. Thus the rover system can follow a trajectory by defining a series of wheel 1 to wheel 2 ratios and the distance that wheel 1 should rotate through while maintaining a given ratio of wheel 2 rotation.

The forklift system described above requires slightly different input in order to track a given trajectory. In this case, it would be necessary to control the steering angle, $h_4$, as well as the thrust forward, $h_5$.

4. Updating Trajectory

The trajectory planned for the mobile base of the MCSM system is determined based upon the three-dimensional estimates of the target location(s). It is important to note that these three-dimensional estimates are dependent upon the view parameters, $C^j=[C_1^j, C_2^j, \ldots, C_6^j]^T$, for each camera, j, as well as the camera-space target locations of the given target point, $(x_{c_i}^j, y_{c_i}^j)$. When either the view parameters or the camera-space target locations change, the estimate of the three dimensional position of the target changes. The view parameters would change if localized video information of the manipulator became available. As mentioned above, in a typical CSM system, video samples of the manipulator are acquired when the manipulator is in the local region close to the terminal position. These video samples are typically given a higher relative weight to the samples acquired in the pre-plan trajectory. Along with the pre-plan samples, and any other samples acquired, the view parameters are updated with the local information by carrying out the minimization defined in Eq. (2). The view parameters containing the localized video information will do a better job in describing the relationships between the camera-space appearances of manipulator features and the actual three-dimensional position of these features in the local region of operation.

The preferred practice in MCSM systems is to acquire some additional video samples of the manipulator in positions close to the terminal pose. This localized visual information is given more relative weight than the samples in the pre-plan. The view parameters are updated. Then, in turn, the estimates of the three-dimensional target locations are also updated based on the updated view parameters. The new values for the three-dimensional locations of the target point can be used to create an updated trajectory for the mobile base of the MCSM system to follow. The updating of the view parameters by acquiring additional video samples of the manipulator can occur while the mobile base is stationary or in motion.

As the mobile base of the MCSM system moves through the prescribed trajectory, the position of the target points change relative to the manipulator on the vehicle. Likewise, the camera-space locations of the target points also change. This is not due to the target actually moving, rather it is due to the fact that the vehicle has moved, since the target location is measured relative to the vehicle. The camera-space locations of the target point are monitored as the vehicle moves towards the target. This tracking can be done while the vehicle is in motion, or the vehicle can come to a stop periodically in order to wait for the system to find the target again.

Once the system finds the new camera-space locations of the target, it is possible to generate a new trajectory for the vehicle to follow. In the case of stopping and starting, the new trajectory would begin with the current position of the rover. If the rover were in motion as the new trajectory was generated, then a suitable time would be determined by the system for when it should transition from carrying out the old trajectory to following the newly updated trajectory.

As the mobile base of the MCSM system closes in on the target object, the holonomic degrees of freedom of the system are moved to their target location(s) as well. The method for resowing the holonomic degrees of freedom depends upon the type of MCSM system in use as well as the task at hand. For instance, in the case of the forklift system, the vertical position of the forks, $h_1$, would be dependent on the three dimensional location of the pallet that the system is engaging. Based on FIG. 4, $h_1$ would be determined based on the Z component of the pallet position. The tilt angle, $h_2$, would be set to keep the forks parallel to the ground. Once the forklift finishes its trajectory, a preprogrammed move of the fork height as well as the tilt angle might be executed in order to engage the pallet.

Consider the task of placing a scientific instrument carried by the robotic arm of the rover depicted in FIG. 3. The single holonomic degree of freedom might be resolved using knowledge of the Z-component of the three-dimensional position of the target rock as well as the information of the length of the arm. In this case, the value for the angle of the arm would be found by:

$$\theta_3 = \sin^{-1}\left(\frac{Z_t}{D}\right), \tag{10}$$

where $Z_t$ refers to Z-component of the three-dimensional position of the target rock and D is the length of the robotic arm.

Although the invention has been shown and described with respect to certain embodiments thereof, it should be understood by those skilled in the art that other various changes and omissions in the form and detail thereof may be made therein without departing from the spirit and scope of the invention as set forth in the appended claims.

We claim:

1. A mobile camera space manipulation means comprising:

a multiple degree of freedom movement manipulator means including;
   a base means,
   an end effector means,
   connection means between the base means and the end effector means allowing multiple degrees of freedom of movement of the end effector means with respect to the base means based on known nominal kinematics, and including first sensing means for producing signals correlated to the orientation of the connection means relative to the base means,
   motive means associated with the base means for allowing locomotion of the base means in a plurality of degrees of freedom of movement and including second sensing means for producing signals correlated to the distance and direction of movement of the base means along a surface;
first cue means associated with the end effector means;
second cue means associated with a work object;
two or more camera means each having a field of view being positionable to capture at least intermittently both the first and second cue means in a field of view, each camera means being attached to the base means;
camera space means associated with each camera means to convert the field of view of each camera means into a corresponding two dimensional camera space; and
processing means including:
   distinguishing means to distinguish the first and second cue means from generally all other contents of the camera spaces;
   tracking means to obtain and store information relating to position and movement of the cue means in the camera spaces, monitoring means to obtain and store information relating to holonomic orientation and position of the connection means relative to the base means from the first sensing means, and nonholonomic history of movement of the base means from the second sensing means;

estimation and planning means to repetitively propose a plan of movement for one or both of the connection means and motive means to bring about a desired positional relationship between the first and second cue means in the camera spaces, the plan being based on information in the tracking means and the monitoring means taking into consideration both holonomic and nonholonomic relationships;

control means for instructing movements of one or both of the connection and motive means to follow the plan in physical space.

2. The mobile camera space manipulation means of claim 1 wherein the base means includes a plurality of wheels for allowing mobility over a surface.

3. The mobile camera space manipulation means of claim 1 wherein the base means consists of a mobile cart.

4. The mobile camera space manipulation means of claim 1 wherein the base means consists of an underwater vehicle.

5. The mobile camera space manipulation means of claim 1 wherein the end effector consists of a grasping means.

6. The mobile camera space manipulation means of claim 1 wherein the end effector consists of a fork lift.

7. The mobile camera space manipulation means of claim 1 wherein the base means includes a plurality of wheels for allowing mobility over a surface.

8. The mobile camera space manipulation means of claim 1 wherein the base means consists of a mobile cart.

9. The mobile camera space manipulation means of claim 1 wherein the base means consists of an underwater vehicle.

10. The mobile camera space manipulation means of claim 1 wherein the end effector consists of a grasping means.

11. The mobile camera space manipulation means of claim 1 wherein the end effector consists of a fork lift.

12. A camera space manipulation control means, utilizing two or more camera means for engaging an end effector means with a work object, comprising:

an articulateable manipulator means of known nominal kinematics in physical space extending from a mobile base to an outward end for movement of the outward end in a predefined physical work space in the physical space relative to the mobile base, the mobile base having a nonholonomic kinematic relationship between wheel rotation and base-position response, the manipulator means including a motor means for articulating the manipulator means in said physical space, the mobile base having a motor means and a steering means to locate the mobile base in any direction over a surface or in three dimensions, and means for producing a signal identifying an approximate position and orientation of the manipulator means with respect only to the base, wherein the kinematic description of the manipulator means with base being known and the kinematic description of the mobile base being known only relative to prior movement;

each camera means being positioned on the mobile base and each camera means being oriented generally towards the end effector means for providing camera vision intermittently of the end effector means and the work object in camera space;

first visual cue means associated with the end effector means;

second visual cue means associated with the work object, the first and second visual cue means comprising means which are distinct and identifiable in said camera space manipulation control means in any surrounding environment, the first and second visual cue means providing descriptions of three dimensional physical space maneuver objectives as admissible configurations of visual cue means in the two dimensional camera spaces of the camera means; and a control means operatively connected to the manipulator means and the camera means, the control means including computing means for receiving the signal from the manipulator means and identifying the approximate position and orientation of the manipulator means with respect to the base means through the use of previously known kinematics, and signal processing means which identifies and tracks the visual cue means in the camera spaces to convert such into two dimensional camera space cue position signals, the manipulator approximate position and orientation signal and the camera space cue position signals being used in the control means to estimate the relationship between the position and orientation of the manipulator means and the location in each camera space of the visual cue means placed on the manipulator means, and using the current estimations of these relationships selecting required movement and orientation of the manipulator means which will bring about admissible configurations of the visual cue means in each camera space to insure successful engagement of the object in physical space, and to control orientation commands resulting from the estimated relationship.

13. The mobile camera space manipulation means of claim 1 wherein the base means includes a plurality of wheels for allowing mobility over a surface.

14. The mobile camera space manipulation means of claim 1 wherein the base means consists of a mobile cart.

15. The mobile camera space manipulation means of claim 1 wherein the base means consists of an underwater vehicle.

16. The mobile camera space manipulation means of claim 1 wherein the end effector consists of a grasping means.

17. The mobile camera space manipulation means of claim 1 wherein the end effector consists of a fork lift.

18. A method of camera space manipulation utilizing at least two camera means for engaging an articulateable manipulator means with an object where there is not any known prior three dimensional physical space relationship between the manipulator means and the object, and there is a known three dimensional physical space relationship between the manipulator means and physical space in a two dimensional image at the focal plane of the camera means, denoted as camera space, comprising the steps:

orienting each camera means to view the manipulator means which has an arm extending from a base to an outward end which is moveable in physical work space with known nominal kinematics relative to the base;

the manipulator means including a motor means which articulates the manipulator means in said physical work space, and means for producing a signal identifying the approximate position and orientation of the manipulator means with respect only to the base in said physical work space;

the base having motor and steering means for moving the base in any direction along a surface and including means for producing a signal identifying the approximate position and orientation of the base, each camera means being positioned and oriented to provide, at least intermittently, camera vision of at least the outward end of the manipulator means in at least part of the physical work space to view at least the outer end of the manipulator means and the work object in camera space;

placing a first visual cue means in association with an outward end of the arm;

placing a second visual cue means in association with the object to be engaged by the manipulator means, the first and second visual cue means comprising means which are distinct and identifiable in said camera space from the remainder of the system and any surrounding environment, the first and second visual cue means providing descriptions of three dimensional physical space maneuver objectives in terms of admissible configurations of the visual cue means in the two dimensional camera space of each camera;

receiving signals from the manipulator means and base means and identifying the approximate position and orientation of the manipulator means and base means with respect to the base and surface respectively through the use of known nominal kinematics;

identifying and tracking the visual cue means in the two dimensional camera space of each camera means and respectively estimating the relationship between the position and orientation of the manipulator means and the location in each camera space of the visual cue means placed on the manipulator means, and using the current estimation of these relationships to select the movement and to command the orientation of the manipulator means which will bring about the admissible configurations of the visual cue means in each camera space which insures successful engagement of the object; and continuously controlling movement and orientation of the manipulator means according to such autonomously selected movement and orientation commands to achieve engagement of the manipulator means with the work object in said physical work space.

* * * * *

UNITED STATES PATENT AND TRADEMARK OFFICE
CERTIFICATE OF CORRECTION

| | | |
|---|---|---|
| PATENT NO. | : 6,194,860 B1 | Page 1 of 1 |
| APPLICATION NO. | : 09/430940 | |
| DATED | : February 27, 2001 | |
| INVENTOR(S) | : Michael J. Seelinger, John-David S. Yoder and Steven B. Skaar | |

It is certified that error appears in the above-identified patent and that said Letters Patent is hereby corrected as shown below:

CLAIMS  The following claims 13-17 should read as shown below --

13. The mobile camera space manipulation means of claim 12 wherein the base means includes a plurality of wheels for allowing mobility over a surface.

14. The mobile camera space manipulation means of claim 12 wherein the base means consists of a mobile cart.

15. The mobile camera space manipulation means of claim 12 wherein the base means consists of an underwater vehicle.

16. The mobile camera space manipulation means of claim 12 wherein the end effector consists of a grasping means.

17. The mobile camera space manipulation means of claim 12 wherein the end effector consists of a fork lift. --

Signed and Sealed this

Twenty-ninth Day of August, 2006

JON W. DUDAS
*Director of the United States Patent and Trademark Office*